(12) United States Patent
Ben-Ezra

(10) Patent No.: US 8,849,667 B2
(45) Date of Patent: Sep. 30, 2014

(54) METHOD AND APPARATUS FOR SPEECH RECOGNITION

(71) Applicant: Novospeech Ltd., Petach Tikva (IL)

(72) Inventor: Yossef Ben-Ezra, Rehovot (IL)

(73) Assignee: Novospeech Ltd., Petach Tikva (IL)

( * ) Notice: Subject to any disclaimer, the term of this patent is extended or adjusted under 35 U.S.C. 154(b) by 0 days.

(21) Appl. No.: 14/237,128

(22) PCT Filed: Jul. 7, 2013

(86) PCT No.: PCT/IL2013/050577
§ 371 (c)(1),
(2), (4) Date: Feb. 4, 2014

(87) PCT Pub. No.: WO2014/020588
PCT Pub. Date: Feb. 6, 2014

(65) Prior Publication Data
US 2014/0222431 A1  Aug. 7, 2014

Related U.S. Application Data

(60) Provisional application No. 61/677,605, filed on Jul. 31, 2012.

(51) Int. Cl.
*G10L 15/04* (2013.01)
(52) U.S. Cl.
USPC ................. 704/254; 704/256; 704/242

(58) Field of Classification Search
USPC ......... 704/231, 235, 242, 236, 240, 256, 254; 375/240
See application file for complete search history.

(56) References Cited

U.S. PATENT DOCUMENTS

| 6,347,297 B1 | 2/2002 | Asghar et al. |
| 6,907,398 B2 * | 6/2005 | Hoege ............................ 704/265 |
| 2003/0061044 A1 | 3/2003 | Miyazawa et al. |
| 2010/0150222 A1 * | 6/2010 | Meyers et al. ............... 375/240 |

OTHER PUBLICATIONS

Patent Cooperation Treaty. "Notification of Transmittal of the International Search Report and the Written Opinion of the International Searching Authority, or the Declaration". Issued for PCT/IL2003/050577 on Nov. 7, 2013. (10 pages).

* cited by examiner

*Primary Examiner* — Huyen X. Vo
(74) *Attorney, Agent, or Firm* — Tutunjian & Bitetto, P.C.

(57) ABSTRACT

A computer-implemented method, apparatus and computer program product. The computer-implemented method performed by a computerized device, comprising: transforming a hidden Markov model to qubits; transforming data into groups of qubits, the data being determined upon the hidden Markov model and features extracted from an audio signal, the data representing a likelihood observation matrix representing likelihood of phoneme and state combinations in an audio signal; applying a quantum search algorithm for finding a maximal value of the qubits; and transforming the maximal value of the qubits into a number, the number representing an entry in a delta array used in speech recognition.

11 Claims, 4 Drawing Sheets

METHOD AND APPARATUS FOR SPEECH RECOGNITION

CROSS-REFERENCE TO RELATED APPLICATION

This application claims the benefit of U.S. Provisional Application No. 61/677,605 filed Jul. 31, 2012, entitled "METHOD AND APPARATUS FOR SPEECH RECOGNITION", which is hereby incorporated by reference in its entirety.

TECHNICAL FIELD

The present disclosure relates to speech recognition in general, and to a method and apparatus for searching within a phoneme lattice, in particular.

BACKGROUND

Speech recognition (SR), also known as Automatic Speech Recognition (ASR), Speech to Text (S2T) or other names, belongs to a large family of audio analysis techniques, used for automatically identifying and extracting information from audio signals. Such techniques may include user recognition, user verification, user identification, emotion analysis, word spotting, and continuous speech recognition which refers to translating spoken words into text.

Some SR engines require specific user training in which an individual speaker reads aloud sections of text into an SR system in order to recognize the user's voice and obtain its characteristics for future recognition. However, such training is not always feasible and it is often required to transcribe voices of unknown or unrecognized speakers in which even the language or the accent may not be a-priori known. Such systems may be referred to as "speaker independent".

A main obstacle in recognizing speech relates to the computation complexity involved in current methods, which is tightly related to the recognition quality. Recognizing spoken words at high quality, i.e., low error rate, requires significant computing resources or significant processing time. Therefore, in order to process large volume of audio and retrieve the spoken words, efficient methods are required. For example, if a call center having hundreds or thousands of agents simultaneously speaking with customers is required to transcribe a significant part of the captured or recorded calls, then in order to obtain meaningful results with reasonable resources, processing an audio signal should take no more than a very small fraction of the length of the signal.

One of the stages of common S2T methods relates to identifying the most probable phoneme sequence that may be obtained from the input audio signal. This stage is particularly time consuming and its complexity may have significant effect on the performance of the whole process.

BRIEF SUMMARY

A first aspect of the disclosure relates to a computer-implemented method performed by a computerized device, the method comprising: transforming a hidden Markov model to qubits; transforming data into groups of qubits, the data being determined upon the hidden Markov model and features extracted from an audio signal, the data representing a likelihood observation matrix representing likelihood of phoneme and state combinations in an audio signal; applying a quantum search algorithm for finding a maximal value of the qubits; and transforming the maximal value of the qubits into a number, the number representing an entry in a delta array used in speech recognition. Within the method, transforming the hidden Markov model is optionally done offline. The method is optionally adapted to be used in implementing a Viterbi algorithm. Within the method, the quantum search algorithm is optionally Grover's algorithm. The method may further comprise: receiving an audio signal; for each time window in the audio signal, extracting a feature vector representing the audio signal at the time window; determining the likelihood observation matrix based upon the feature vector and the hidden Markov model; and selecting an optimal path from the delta array to obtain a phoneme sequence representing the audio signal. A mobile computing device may implement the method, wherein the mobile device performs speech recognition when no connection to external resources is available.

Another aspect of the disclosure relates to an apparatus having a processing unit and a storage device, the apparatus comprising: a hidden Markov model converted into qubits; and a delta array determination component for searching a maximal value associated with a column of a likelihood observation matrix representing likelihood of phoneme and state combinations in an audio signal, the delta array determination component comprising: a conversion component for converting numbers into qubits and vice versa; and a quantum search component for finding a maximal value of qubits using the likelihood observation matrix and the hidden Markov model as converted into qubits. Within the apparatus, the quantum search component optionally applies Grover's algorithm. The apparatus may further comprise: an audio receiving component for receiving an audio signal; a feature extraction component for extracting a feature vector representing the audio signal at a time window; a likelihood observation matrix determination component for determining the likelihood observation matrix based upon the feature vector and the hidden Markov model; and an optimal path selection component for selecting an optimal path from the delta array to obtain a phoneme sequence representing the audio signal. A mobile computing device may comprise the apparatus wherein the mobile device performs speech recognition when no connection to external resources is available.

Yet another aspect of the disclosure relates to a computer program product comprising: a non-transitory computer readable medium; a first program instruction for transforming a hidden Markov model to qubits; a second program instruction for transforming data into groups of qubits, the data being determined upon the hidden Markov model and features extracted from an audio signal, the data representing a likelihood observation matrix representing likelihood of phoneme and state combinations in an audio signal; a third program instruction for applying a quantum search algorithm for finding a maximal value of the qubits; and a fourth program instruction for transforming the maximal value of the qubits into a number, the number representing an entry in a delta array used in speech recognition, wherein said first, second, third and fourth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
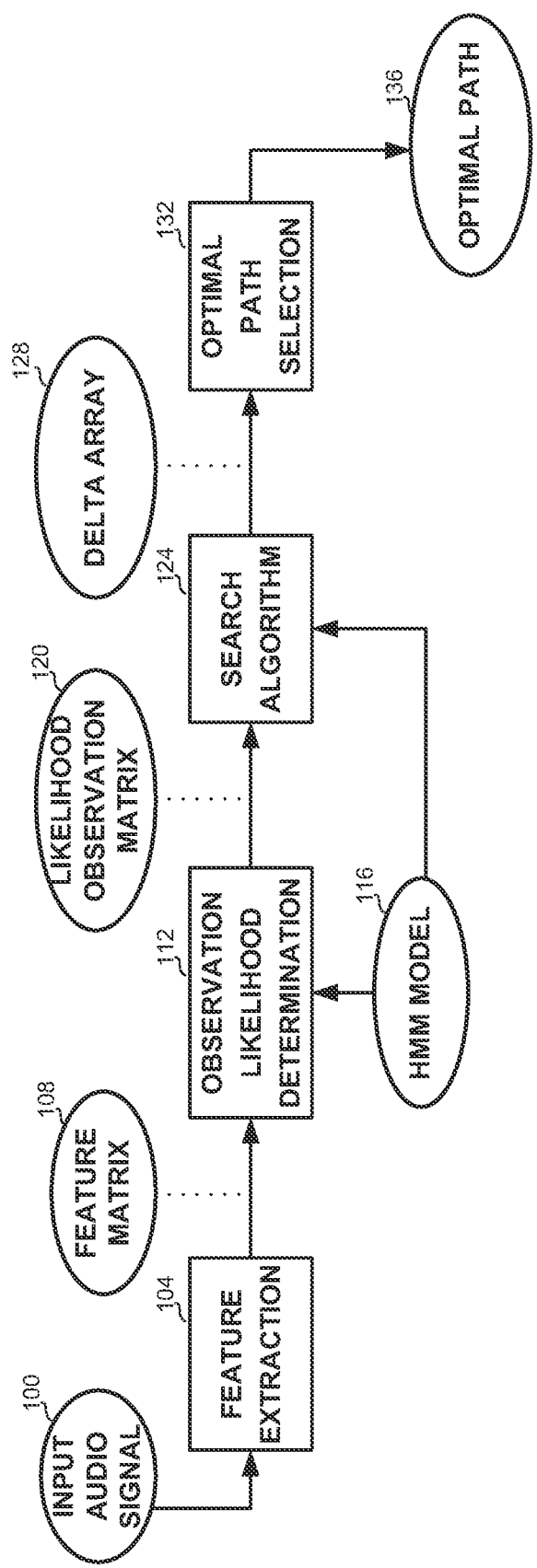
FIG. 1 is a flowchart of steps in a method for automatic speech recognition.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block or blocks in the block diagram.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter is the time consumption of speech to text common techniques, which makes them unusable for many applications. If transcribing a particular audio signal takes more than a fraction of the audio signal length, then transcribing large volume of signals, as may be required by call centers, service centers, security services or others, is impractical.

In another example, it is currently impossible to convert free speech into text in standalone embedded devices, and the devices have to connect to external computing platforms in order to complete such tasks As detailed in association with FIG. 1 below, some known S2T methods comprise applying a Viterbi search algorithm for calculating a delta array indicating for each phoneme at each time frame, the probability that the phoneme was spoken at the respective time. The delta array is calculated using an observation likelihood matrix which indicates for each phoneme the likelihood it was spoken at the time frame, without taking into account other time fames) as may be obtained, for example, from a Gaussian Mixture Model, and a classification engine such as a Hidden Markov Model 1 (HMM) which provides the distribution and transition probabilities between phoneme and states combinations.

Using traditional techniques, the complexity of the Viterbi algorithm is usually in the order of magnitude of $T_r^{2'}$ i.e., $O(T_r^2)$, wherein $T_r$ is summation over all words in a dictionary, of the number of phonemes in each word multiplied by the number of states each phoneme can assume (typically three states in the recognition phase and five states during the training phase including start and end states. The transition probability between the first and second states is the entry probability of the phoneme, and the transition probability between the fourth and fifth states is the exit entry probability of the phoneme).

One technical solution comprises the application of a quantum search technique to the Viterbi algorithm, thus reducing the complexity of the algorithm.

In order to apply quantum search, the searched data has to be converted into quantum bits (qubits) upon which the quantum search can operate. The observation likelihood matrix which relates to the audio to be transcribed, may only be converted at real time. However, the Hidden Markov Model, which is a very large data structure, can be converted offline and stored, so that this conversion does not require computing resources at recognition time.

One technical effect of the disclosed subject matter relates to performing the Viterbi search at O(Tr*sqrt(Tr)) complexity per each time frame, which is lower than the complexity enabled by prior art techniques. This provides for better performance using the same HMM model, which may account for processing more audio signals or channels with the same computing resources. Alternatively or additionally, more detailed phonetic models having more phonemes, or more detailed linguistic models having more words may be used. In yet additional embodiments, the used search beam may be extended, thus searching a larger number of paths in the delta array, which in turn accounts for higher accuracy transcription without requiring exponentially more time or more computing resources.

Another technical effect of the disclosed subject matter relates to implementing speech recognition in real time using limited hardware resources such as processing power or memory, such as those available in embedded systems. For example, a handheld device such as a mobile phone may be able to recognize speech using only its own processing resources without having to use additional resources such as resources provided by cloud computing. This may enable faster recognition as well as recognition when the device is offline and not connected to any external computing resource.

Referring now to FIG. 1, showing a flowchart of steps in a method for automatic speech recognition.

An input audio signal 100 may be received from any source and via any channel, for example from a microphone, from broadcasting, retrieved from storage, received over a network connection or the like. The signal may be received as a file of known length or as a stream.

Input signal 100 is input into a feature extraction step 104. The features are typically arranged into feature vector, wherein each feature vector represents the features at a time window. Typically, the time windows may be of 5-100 mSec and may overlap, e.g., 20 mSec with 10 mSec overlap between consecutive windows.

The features may be Mel-frequency cepstrum coefficients (MFCC) features, frequency cepstrum coefficients (FCC)

features, or the like. For example, when using MFCC features, 39 features may be extracted, wherein 13 features relate to energy, other 13 features relate to the first derivative of the energy, and the remaining 13 features relate to the second derivative of the energy. However, any other feature set of any required length may be used.

The output of feature extraction step 104 is feature matrix 108, in which each column represents the features extracted from a particular time window of the audio input.

Observation likelihood determination step 112 uses feature matrix 108, together with state probabilities that may be obtained from a Gaussian Mixture Model (GMM), to generate likelihood observation matrix 120. Likelihood observation matrix 120 represents for each feature vector and for each state of phoneme the probability that the feature vector is associated with the particular phoneme. In some embodiments, likelihood observation matrix 120 may comprise a row for each phoneme or each word and a column for each time window, such that each entry represents the likelihood or the probability that the specific state of phoneme appeared in the specific time window.

HMM 116 may comprise phoneme and state transition information, which may be language-dependent. HMM 116 is further detailed in association with FIG. 2 below.

Likelihood observation matrix 120 and HMM model 116 are input into a search algorithm 124 such as Viterbi search algorithm to generate delta array 128. In some embodiments delta array 128 may comprise a row for phoneme and state combination within each word, such that delta array 128 may comprise the total number over all words of the number of phonemes in the word*number of states rows. Typically, each phoneme can be at any of three states, although during training of a HMM five states may be used. The first and the last states are used for determining probability of starting and ending a word. Delta array 128 may also comprise a column for each time window, such that each entry in delta array 128 comprises the probability that the specific phoneme at the specific state as part of a specific word was spoken at the particular time window.

The Viterbi algorithm is based on the assumption that the optimal sequence relating to time window 0 to time window n+1 comprises the optimal sequence at time window 0 to time window n, so that no backward correction is performed.

The value of each entry in a particular column is thus calculated based on the maximum product between each entry in the previous column and the transition probability between the respective phoneme and state combinations, multiplied by the relevant probability in likelihood observation matrix 120.

The transition probabilities may be expressed, for example, as a transition matrix representing the probability of transition from one phoneme and state combination to another, as detailed below.

Delta array 128 may then be input into optimal path selection step 132, which starts from the last time frame, and selects the most probable phoneme and state combination for that time frame as expressed in the entry of the last column of delta array 128 having the highest value. The algorithm then moves back to the entry in the previous column from which the selected entry in the last column got its maximal value, in accordance with formula (1) below, and so on until the first time frame of the segment. Alternatively, the optimal path may be provided during the search algorithm such that once a column of delta array 128 is completed, the phoneme and state combination having the highest probability is provided.

Figure 2:
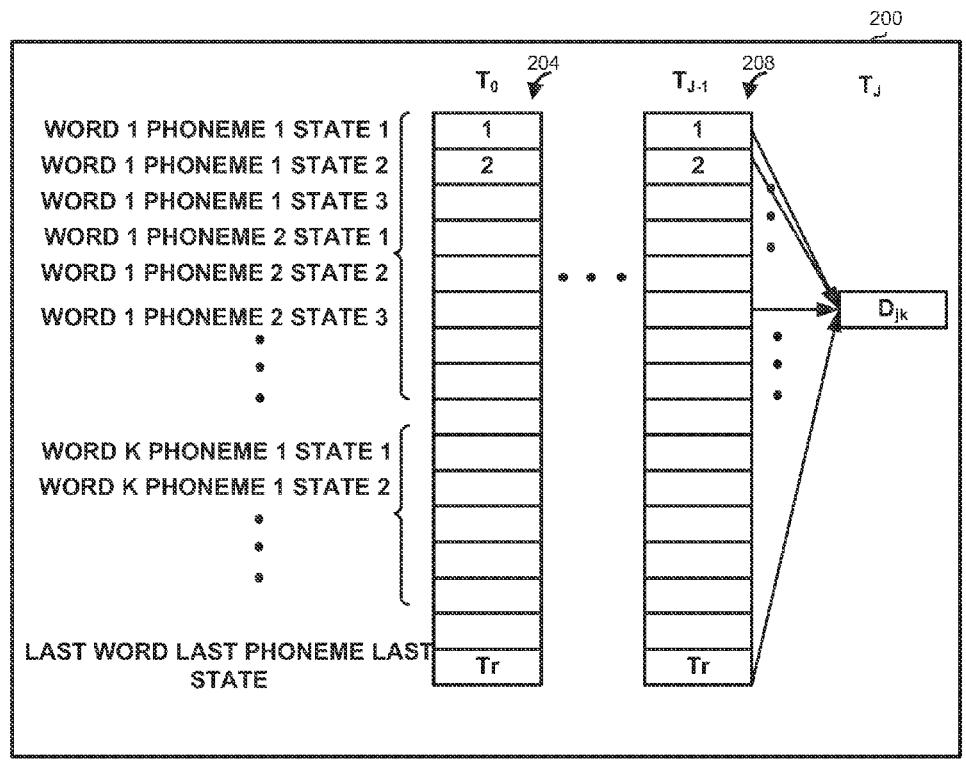
FIG. 2 is a schematic illustration of delta array calculation for obtaining the most probable phoneme sequence, and state transition matrix and state chart.
Figure 2:
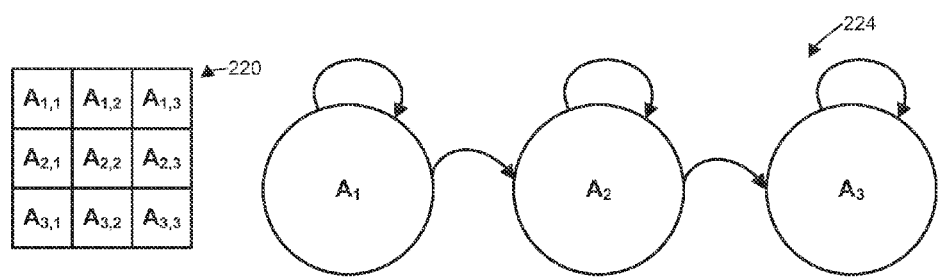

Referring now to FIG. 2, showing a schematic illustration of delta array calculation for obtaining the delta array, from which the most probable phoneme sequence can be deduced.

Delta array 200 comprises a row for each phoneme and state combination in each word. It will be appreciated that a more complex model can be used, relating for example to biphones (a sequence of two phonemes and multiple states) or triphones (a sequence of three phonemes and multiple states), which require a significantly larger number of rows.

Delta array 200 comprises a column for each time window such as column 204 relating to some arbitrary time $T_0$, and column 208 relating to sometime $T_{j-1}$, later than $T_0$. Each entry $D_{jk}$ comprises a probability that the corresponding phoneme and state combination (j) was spoken within the relevant word at time window k.

Matrix 220 and state chart 224 are two representations of state transitions associated with a particular phoneme A. Each entry $A_{i,j}$ in matrix 220 represents the probability of transition of phoneme A from state i to state j, wherein i and j are between 1 and 3, and i<=j (i.e., transition is always to the same state or to a more advanced state). State diagram 224 provides another representation of the transition probabilities, demonstrating that the phoneme can remain in the same state or transit to the next state. State diagram 224 does not show the start and end states for the phoneme since these are not used in recognition.

A Hidden Markov Model comprises a matrix such as matrix 220 (or any other corresponding data structure) for each phoneme in each word.

Each phoneme and state combination is also associated with a probability derived from a probability density function. Such probability may be obtained, for example, from a Gaussian Mixture Model (GMM) that receives the feature vector at the relevant time frame and outputs the probability for a particular phoneme state.

The probability in entry $D_{jk}$ in delta array 200 thus indicates the likelihood that the phoneme and state combination may have indeed been identified at the time window, based on the standalone likelihood of the relevant feature vector associated with the phoneme state, the probabilities of previous phoneme state combinations, and the transition probabilities from the previous combinations. The standalone likelihood may be derived from the feature vector and the GMM. The transition probabilities between phoneme and state combinations are derived from the HMM.

The Viterbi algorithm considers at each stage only the maximum probability of the current phoneme state, and the transfer probabilities to that state from previous stage Thus, entry $D_{jk}$ may be calculated as:

$$D_{jk} = \left[\max_{i=1 \ldots n} (D_{j-1,i} * Tr(i, k))\right] * B_{jk} \quad (1)$$

wherein $D_{j-1,i}$ represents the value at row i in a previous column, $T_r(i, k)$ represents the transition probability from phoneme and state combination i to phoneme and state combination k, as expressed in the transition matrix for the same phoneme, and in the linguistic model for transition between different phonemes and optionally different words, and $B_{j,k}$ represents the probability that phoneme and state j were identified at time window k, as expressed in the likelihood observation matrix.

Thus, determining entry $D_{jk}$ takes into account the features extracted at time j, as well as the maximum between the multiplications of probabilities for phoneme and state combinations at time j−1, and the transition probability between the combinations. Finding the maximum product is of complexity $O(T_r^2)$ and is a major processing resources consumer in speech recognition.

The probabilities of transition between phonemes are determined based on the exit probability of the previous phoneme and the entry probability of the next phoneme, as may be determined also during training and may be expressed by the transition probability between the first and second states of the phoneme (exit probability), and the transition probability between the fourth and fifth states (entry probability).

It will be appreciated that since each phoneme and each phoneme combination may repeat in multiple words, the same sequence of probabilities may repeat for a multiplicity of words having similar parts. For example the probabilities of the first phonemes and state combinations in the words "meaningful" and "meaningless" will be substantially the same.

Figure 3:
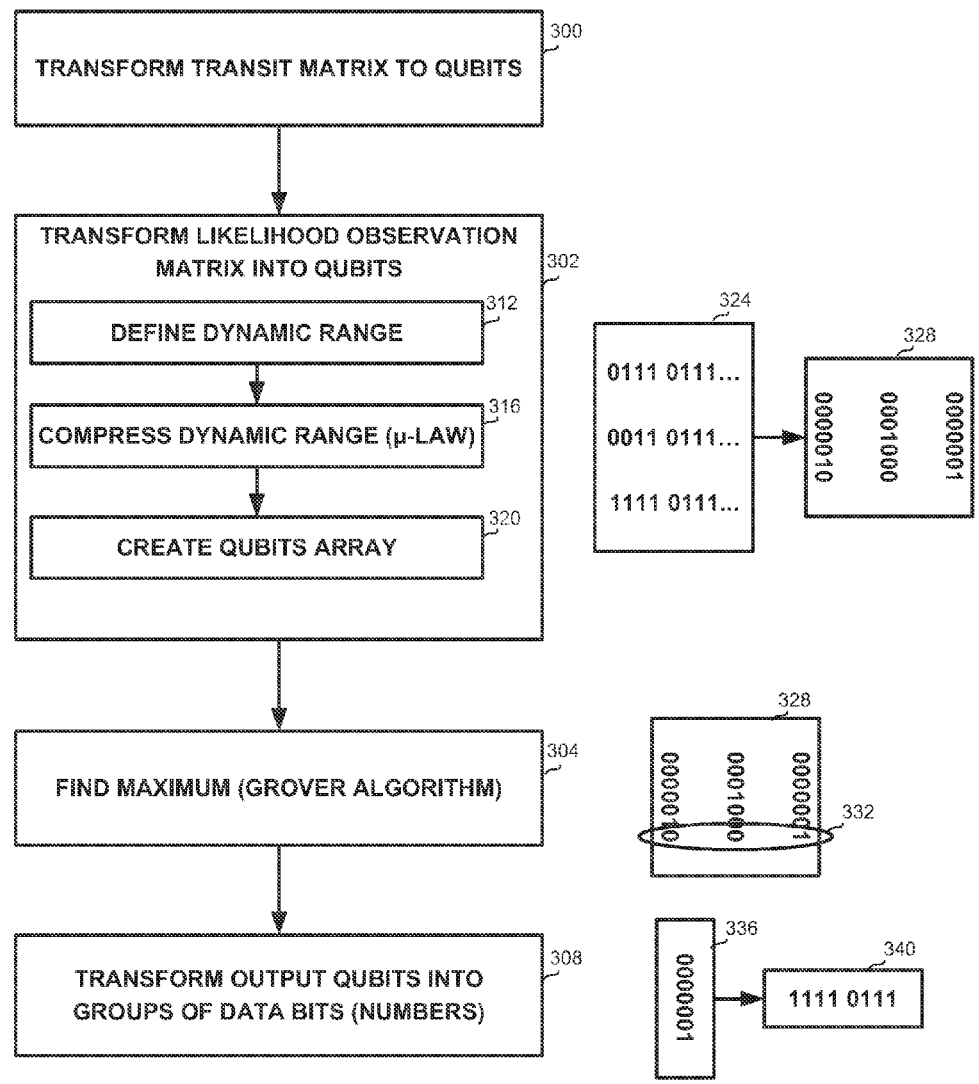
FIG. 3 shows a flowchart of steps and illustrative example of delta array calculation, in accordance with some exemplary embodiments of the disclosed subject matter.

Referring now to FIG. 3, showing a flowchart of steps in a method, and illustrative example for determining a maximum value as required in formula (1) above, using quantum search. The method displayed in the flowchart may be used for determining the maximal product during the delta array calculation, and/or determining the phoneme and state having the maximal value when retrieving the optimal path, i.e. the phoneme sequence.

On step 300, the HMM model, including the transition matrix of states for each phoneme in each word is transformed into qubits, which are the basic units used by quantum search algorithms. The transformation is further detailed in association with step 302 below. Since the HMM model is fixed for a particular environment and does not change in accordance with the audio signal, the model may be converted to qubits offline and stored for multiple recognitions, rather than be transformed online for each recognition. The transformation complexity of the model may be 2*F*Tr*N*O(A) steps, wherein F is the number of features, Tr is the total number of state and phoneme combinations, N is the number of used Gaussians for GMM, and O(A) is the complexity of the conversion algorithm. However, this transformation is performed once and may be performed offline, thus it does not add to the online recognition complexity.

On step 302, the data related to the audio signal, including data related to the likelihood observation matrix is transformed into qubits as well. The likelihood observation matrix is the probability for each phoneme to have been present at the particular time frame, based on the feature vector extracted for that time frame.

Transformation into qubits step 302 may include substep 312 of defining a dynamic range for the numbers to be converted, substep 316 for compressing the dynamic range, using for example Haw, and substep 320 for creating the qubits array.

For example, the three eight-bit numbers shown in data 324 which may be part of a larger number of groups, are transformed into 7-bit numbers shown in data 328, while preserving partial order (in FIG. 3 the MSB appears on the right-hand side of the number), such that the numbers are orthogonal. Thus, 01110111 is transformed into 0000010, 00110111 is transformed into 0001000, and 11110111 is transformed into 0000001. This conversion is of O(A) complexity per each number, so the total complexity is of $O(A)*T_r$.

It will be appreciated that the transformation of step 302 can be applied to the likelihood observation matrix as extracted from the feature vectors using the GMM. Alternatively, the transformation can be adapted to receive the feature vectors and the GMM, which may also be converted to qubits offline, and to output the relevant qubits without having to first generate the likelihood observation matrix from the feature vector.

On step 304, once all data is available in qubits format, the maximum of all numbers is found, using for example Grover's algorithm. Grover's algorithm searches for a "1" in the MSBs of all numbers indicated as 332. Due to the way the numbers were selected in accordance with Haw, it is guaranteed that there is one number having "1" at its MSB, and since the numbers are orthogonal, there is exactly one number having "1" as its MSB. In the example above, the number with an MSB of "1" is the 0000001. The complexity of Grover's algorithm is O(sqrt(Tr)) where in Tr is the total number of phoneme and state combinations for all words.

On step 308, the regular numbers may be retrieved back from the output qubits, so that they can be used in calculating the next column. However, this transformation may be omitted if the next column is also to be determined using qubits. In the example above, the 0000001 is transformed back to 11110111, so that it can be used later when retrieving the optimal path. The complexity of this conversion is also O(A) The overall complexity of determining the entries of each column is thus the maximum between the conversion complexity of step 302, and sqrt(Tr) for each time window.

It will be appreciated that since the search step is the most resource consuming step in extracting the phoneme sequence, reducing the complexity of this step practically reduces the overall time of the algorithm. For example, a reduction in a factor of 8 had been observed in tests performed on ASP system with double precision numbers (64 bit based) using the quantum search for determining the delta array, vs. conventional Viterbi search. In the test routines was use same 2.5-3.5 sec speech sources and was observed almost same recognition accuracy.

Figure 4:
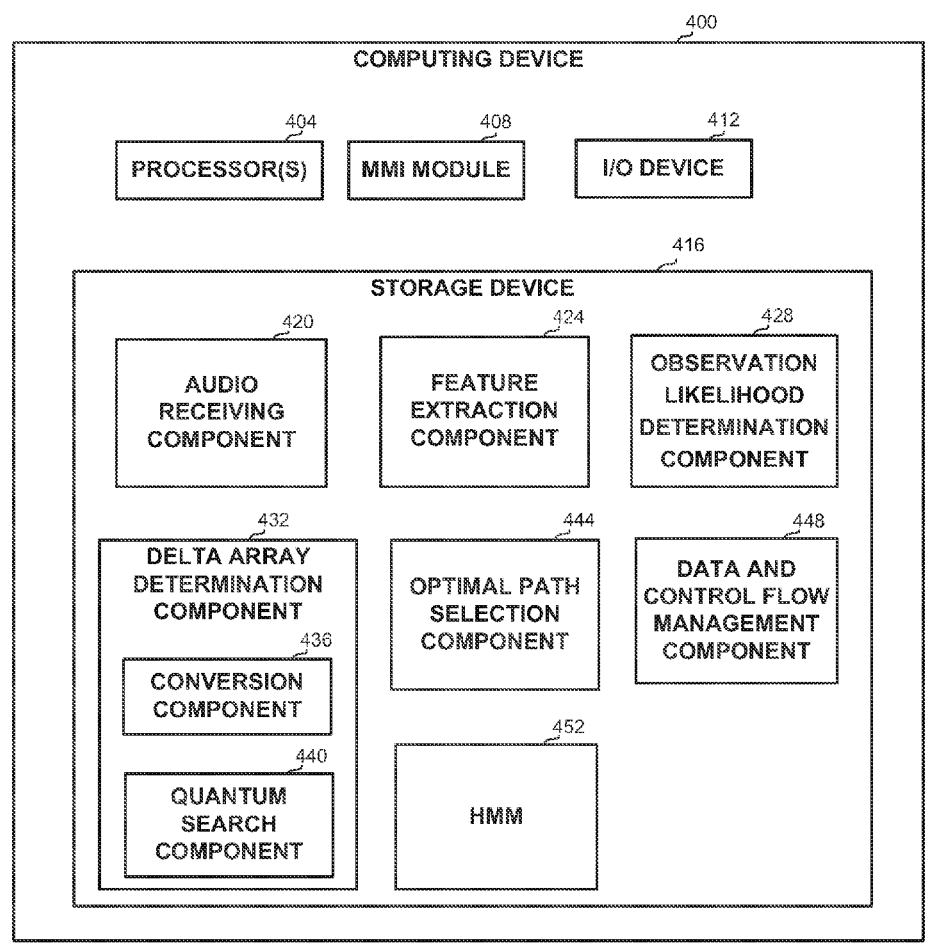
FIG. 4 shows a block diagram of components of an apparatus for speech recognition, in accordance with some exemplary embodiments of the disclosed subject matter.

Referring now to FIG. 4, showing a block diagram of components of an apparatus for speech recognition.

The apparatus comprises a computing device 400, which may comprise one or more processors 404. Any of processors 404 may be a Central Processing Unit (CPU), a microprocessor, an electronic circuit, an Integrated Circuit (IC) or the like. Alternatively, computing device 400 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processors 404 may be utilized to perform computations required by comptuing device 400 or any of it subcomponents.

In some exemplary embodiments of the disclosed subject matter, computing device 400 may comprise MMI module 408. MMI module 408 may be utilized to provide communication between the apparatus and a user for providing input, receiving output or the like. For example. MMI module may be related to a capturing application and/or to presenting recognition results.

In some embodiments, computing device 400 may comprise an input-output (I/O) device 412 such as a terminal, a display, a keyboard, a microphone or another audio input device or the like, used to interact with the system, to invoke the system and to receive or view the results.

Computing device 400 may comprise one or more storage devices 416 for storing executable components. Storage device 416 may also contain data during execution of one or more components. Storage device 416 may be persistent or volatile. For example, storage device 416 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 416 may retain program code operative to cause any of processors 404 to perform acts associated with any of the steps shown in FIG. 1 or FIG. 3 above, for example receiving audio signal, extracting features, determining likelihood observation matrix, searching, or the like.

The components detailed below may be implemented as one or more sets of interrelated computer instructions, executed for example by any of processors 404 or by another processor. The components may be arranged as one or more executable files, dynamic libraries, static libraries, methods, functions, services, or the like, programmed in any programming language and under any computing environment. Storage device 416 may comprise or be loaded with one or more of the components, which can be executed on computing platform 400 by any one or more of processors 404. Alternatively, any of the executable components may be executed on any other computing device which may be in direct or indirect communication with computing platform 400.

Storage device 416 may comprise audio receiving component 420 for receiving audio signals. Audio signals can be received from any capturing device such as a microphone or broadcasting, from a storage device storing previously recorded or generated audio, from another computing device over a communication channel, or from any other source. The audio signals may be received as files, streams, or the like.

Storage device 416 may also comprise feature extraction component 424 for extracting one or more features from the audio at each time frame. The features may be MFCC, FCC or others, and the time window can be of any required length. It will be appreciated that a tradeoff exists between the required computing resources and the length of the time windows, such that fewer computing resources are required when processing the signal in longer time windows, but longer time windows, in which a single feature vector represents each time window, provides lesser results.

Yet another component loaded to storage device 416 may be observation likelihood determination component 428 for determining an observation likelihood matrix, which represents probabilities associated with each phoneme and state combinations for each time frame, based on the extracted features and probability indications, such as a Gaussian Mixture Model.

Storage device 416 may also comprise or be in association with delta array determination component 432 for determining the probabilities of each phoneme and state combination at each time frame, based on the likelihood matrix and a transition matrix which may also be part of the HMM. Delta array determination component 432 may comprise a conversion component 436 for converting between numbers and qubits as detailed in association with step group 302 and step 308 of FIG. 3 above, and quantum search component 440 which searches for a maximum among a group of qubits, using for example Grover's algorithm or another algorithm of the same or better performance, as detailed in association with step 304 of FIG. 3 above.

Optimal path selection component 444 which may also be loaded or stored on storage device 416 is adapted to select for each time frame the phoneme and state combination having the highest probability. The sequence of selected phonemes may be presented as the result of the recognition. Optimal path selection component 444 may be implemented as part or in connection with delta array determination component 432 detailed above.

Storage device 416 may also comprise data and control flow management component 448 for managing the flow of information and control between the components, for example transferring an audio signal received by audio receiving component 420 to feature extraction component 424, providing the output, or the like.

Storage device 416 may also comprise one or more data structures, such as one or more HMM models 452 or GMM models for speech recognition. Device 416 can store different models trained on speech with different characteristics, different languages, or the like.

It will be appreciated that storage device 416 can comprise additional 5 components, such as audio enhancement component for improving the audio quality, removing noise, removing silence periods, or the like. Storage device 116 can also comprise language models for adapting the resulting phoneme sequence into words while considering linguistic characteristics such as word frequency, or the like.

The disclosed method and apparatus provide for enhanced speech recognition using HMM. By using quantum search methods, the recognition is improved from having complexity of $O(Tr*Tr)$ to $O(TR*sqrt(Tr))$, such that higher accuracy can be achieved with the same resources and/or larger volume of audio can be processed. The performance improvement may benefit from transforming the HMM to qubits offline, such that only the audio-related data needs to be transformed online. The improved complexity may enable and embedded device such as a hand held device to perform speech recognition without having to utilize external resources such as an external; server, a cloud computing network or the like. This may enable a mobile phone user, for example, to use the full range of speech activation features even when the device is offline.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on a first computer, partly on the first computer, as a stand-alone software package, partly on the first computer and partly on a second computer or entirely on the second computer or server. In the latter scenario, the second computer may be connected to the first computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device having a processor, comprising:
    transforming a hidden Markov model to qubits;
    transforming data into groups of qubits, the data being determined upon the hidden Markov model and features extracted from an audio signal, the data representing a likelihood observation matrix representing likelihood of phoneme and state combinations in an audio signal;
    applying, by the processor, a quantum search algorithm for finding a maximal value of the qubits; and
    transforming the maximal value of the qubits into a number, the number representing an entry in a delta array used in speech recognition.

2. The computer-implemented method of claim 1, wherein transforming the hidden Markov model is done offline.

3. The computer-implemented method of claim 1, wherein the computer-implemented method is adapted to be used in implementing a Viterbi algorithm.

4. The computer-implemented method of claim 1, wherein the quantum search algorithm is Grover's algorithm.

5. The computer-implemented method of claim 1, further comprising:
    receiving an audio signal;
    for each time window in the audio signal, extracting a feature vector representing the audio signal at the time window;
    determining the likelihood observation matrix based upon the feature vector and the hidden Markov model; and
    selecting an optimal path from the delta array to obtain a phoneme sequence representing the audio signal.

6. A mobile computing device implementing the computer-implemented method of claim 1, the mobile device performing speech recognition when no connection to external resources is available.

7. An apparatus, the apparatus comprising:
    a processor;
    a hidden Markov model converted into qubits; and
    a delta array determination component for searching a maximal value associated with a column of a likelihood observation matrix representing likelihood of phoneme and state combinations in an audio signal, the delta array determination component comprising:
        a conversion component for converting numbers into qubits and vice versa; and
        a quantum search component for finding, using the processor, a maximal value of qubits using the likelihood observation matrix and the hidden Markov model as converted into qubits.

8. The apparatus of claim 7, wherein the quantum search component applies Grover's algorithm.

9. The apparatus of claim 7, further comprising:
    an audio receiving component for receiving an audio signal;
    a feature extraction component for extracting a feature vector representing the audio signal at a time window;

a likelihood observation matrix determination component for determining the likelihood observation matrix based upon the feature vector and the hidden Markov model; and an optimal path selection component for selecting an optimal path from the delta array to obtain a phoneme sequence representing the audio signal.

10. A mobile computing device comprising the apparatus of claim 7, the mobile device performing speech recognition when no connection to external resources is available.

11. A computer program product comprising:

a non-transitory computer readable medium;

a first program instruction for transforming a hidden Markov model to qubits;

a second program instruction for transforming data into groups of qubits, the data being determined upon the hidden Markov model and features extracted from an audio signal, the data representing a likelihood observation matrix representing likelihood of phoneme and state combinations in an audio signal;

a third program instruction for applying a quantum search algorithm for finding a maximal value of the qubits; and a fourth program instruction for transforming the maximal value of the qubits into a number, the number representing an entry in a delta array used in speech, recognition, wherein said first, second, third and fourth program instructions are stored on said non-transitory computer readable medium.

* * * * *